United States Patent [19]
Clark et al.

[11] 3,949,351
[45] Apr. 6, 1976

[54] VARIABLE DELAY LINE

[75] Inventors: Arthur E. Clark, Adelphi; Howard T. Savage, Greenbelt, both of Md.

[73] Assignee: The United States of America as represented by the Secretary of the Navy, Washington, D.C.

[22] Filed: June 3, 1974

[21] Appl. No.: 476,119

[52] U.S. Cl. .................... 340/15; 333/30 M; 75/152
[51] Int. Cl.² .......................................... H04B 11/00
[58] Field of Search ............. 148/31.55, 31.57, 105, 148/108; 340/15; 333/30 M

[56] References Cited
UNITED STATES PATENTS

| | | | |
|---|---|---|---|
| 3,424,578 | 1/1969 | Strnat et al. | 75/213 |
| 3,582,408 | 6/1971 | Onyshkevych | 148/31.55 |
| 3,820,040 | 6/1974 | Berry et al. | 331/156 |

FOREIGN PATENTS OR APPLICATIONS

| | | | |
|---|---|---|---|
| 752,317 | 7/1956 | United Kingdom | 304/191 |

OTHER PUBLICATIONS

Strnat et al, Mag. Properties of Re–Fe Intermetallic Compounds in IEE Trans., Sept. 1966, pp. 489–493.
Narasimhan et al, Mag. Prop. of Rt–Ni Compounds (R=Dy or Ho,T=Fe or Co), in J. Appl. Phys. Vol. 44, 1973, pp. 879–882.

*Primary Examiner*—Maynard R. Wilbur
*Assistant Examiner*—T. M. Blum
*Attorney, Agent, or Firm*—R. S. Sciascia; J. A. Cooke; R. D. Johnson

[57] ABSTRACT

A device for varying the velocity of infrasonic, sonic, and ultrasonic sound waves which has a sound wave transmission element made of a material having the formula $R_xFe_{1-x}$ wherein R is a rare earth selected from the group consisting of Sm, Tb, Dy, Ho, Er, Tm, and mixtures thereof and wherein $0.1 < x < 0.9$, and means for generating a magnetic field of adjustable strength in the transmission element. The velocity of the sound waves within the transmission element increases with increasing magnetic field strength in the transmission element. This device can be used for generating time delays for sound signals in sonar equipment.

39 Claims, 2 Drawing Figures

VARIABLE DELAY LINE

BACKGROUND OF THE INVENTION

This invention relates to sonar systems and more particularly to adjustable delay lines for sonar systems.

Infrasonic, sonic, and ultrasonic sound delay lines are used in a wide variety of applications, ranging from delaying one signal with respect to another e.g. in phased transducers for radar and sonar systems to storage elements for computer systems. For many of these applications it would be desirable to vary the length of the delay time. Since the velocity of infrasonic, sonic, and ultrasonic sound waves in a solid are directly proportional to the square root of the elasticity, changing the elasticity of the material is one way the delay time may be changed.

The possibility of a change in elasticity with magnetization was reported more than one hundred years ago. (See R. M. Bozorth, Ferromagnetism, 684 (D. Van Nostrand Co., New York, 1951)). The biggest effects were found in soft magnetic materials with large magnetostrictions such as well-annealed Ni. Typical values for $\Delta E/E_o$ are .01 to 0.10, which, in fact, scatter from sample to sample. For Ni, at room temperature, values range from 0.06 to 0.18. For annealed Fe, $\Delta E/E_o \simeq$ .004. The maximum change in velocity for infrasonic, sonic, and ultrasonic waves in nickel which can be achieved by generating a magnetic field in the nickel is only from about 3 to about 9 percent. Thus, while the use of magnetic fields is a convenient way to vary the velocity of sound waves in solids, the changes in velocity available in the prior art are so small as to have very limited if any practical applications. Therefore, it would be desirable to find devices or methods which would be capable of substantially altering the velocity of infrasonic, sonic, and ultrasonic sound waves by applying magnetic fields.

SUMMARY OF THE INVENTION

Accordingly, it is an object of this invention to provide time delay for infrasonic, sonic, and ultrasonic sound signals.

Another object of this invention is to provide adjustable time delays for infrasonic, sonic, and ultrasonic sound signals.

A further object of this invention is to provide a device by which time delays of infrasonic, sonic, and ultrasonic sound signals can be adjusted by adjusting the strength of a magnetic field.

Still another object of this invention is to provide a device for adjusting the delay time of infrasonic, sonic and ultrasonic sound signals which will operate at room temperature.

A still further object of this invention is to provide a simple device for providing a wide range of delay times for infrasonic, sonic, and ultrasonic signals.

These and other objects of this invention are obtained by providing a device for adjusting the velocity of infrasonic, sonic, and ultrasonic sound waves comprising a sound wave transmission element composed of a material of the formula $R_xFe_{1-x}$ wherein R is a rare earth selected from the group consisting of Sm, Tb, Dy, Ho, Er, Tm and mixtures thereof, and wherein $0.1 < x < 0.9$, and a means for generating a magnetic field of adjustable strength in the transmission element. This device can be used for generating time delays for sound signals in sonar equipment.

DETAILED DESCRIPTION OF THE PREFERRED EMBODIMENT

Figure 1:
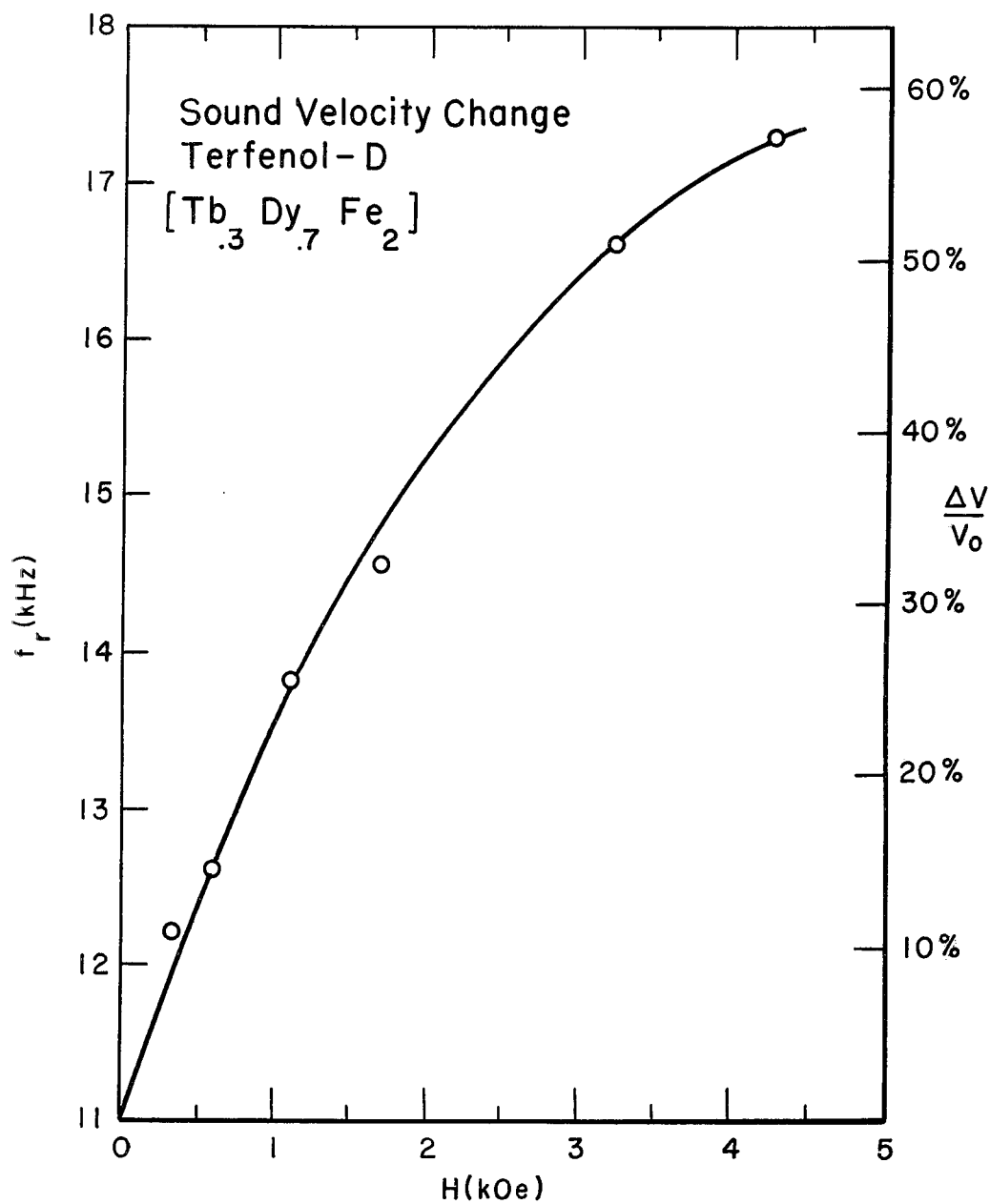
FIG. 1 is a graph showing the resonance frequency, fr, in kHz and the precent change in sound velocity, $\Delta V/\Delta_o \times 100$, as a function of the field strength, H, in kOe. for a 4 inches $\times$ 1/8 inch $\times$ 1/8 inch bar of $Tb_{.3}Dy_{.7}Fe_2$.

In the present invention it has been discovered that the velocity of sound waves can be substantially increased in certain materials when a magnetic field is generated in those materials. (In this specification, sound waves are defined as including infrasonic, sonic, and ultrasonic sound waves.) As the strength of the magnetic field increases, the velocity of sound waves in the material increases. Thus, by adjusting the strength of the magnetic field in a sound wave transmission element made of these materials the velocity of sound waves can be adjusted to selected values.

The materials used in this invention possess the property of having very high magnetostrictions at room temperature as was disclosed in Navy Case No. 57.688, application Ser. No. 471,640 filed on May 20, 1974, which was a continuation-in-part of application Ser. No. 235,411 now abandoned, filed on Mar. 16, 1972, by A. E. Clark and H. S. Belson. It has been discovered in this invention that as a result of these high magnetostrictive values substantial increases in the velocity of sound waves in these materials can be induced if a magnetic field is applied to these materials.

The sound wave transmission element of the present invention is composed of a material of the formula $R_xFe_{1-x}$ wherein R is a rare earth selected from the group consisting of Sm, Tb, Dy, Ho, Er, Tm and mixtures thereof wherein $0.1 < x < 0.9$, but preferably $0.1 < x < 0.5$, and more preferably $x = 1/3$. More preferably the transmission element is composed of a material of the formula $Tb_zDy_{1-z}Fe_2$ wherein $0.1 < z < 0.9$, but most preferably $0.2 < z < 0.4$. The materials used in the present invention are prepared by arc casting and the resulting materials are either alloys or true compounds.

The selection of these materials is based on their high magnetostrictive properties at room temperature. (See table, 1, these values are taken from the Clark et al application, supra). Based on the discovery that $Tb_{.3}Dy_{.7}Fe_2$ and $Tb_{.28}Dy_{.72}Fe_2$ yield excellent results in changing the velocity of sound waves when subjected to a magnetic field, it is expected that these other materials having extremely high magnetostrictions will also provide good results. Table 2 represents predicted maximum changes in velocity for $SmFe_2$, $TbFe_2$, $TmFe_2$, and $TbFe_3$ assuming that the change in velocity will be proportional to $\lambda_s$ the magnetostriction at magnetic saturation.

TABLE I

| Material | Magnetostriction (in units of $10^{-6}$) At Room Temperature |
|---|---|
| $TbFe_2$ | 2630 |
| $DyFe_2$ | 591 |
| $ErFe_2$ | −344 |

TABLE I-continued

| Material | Magnetostriction (in units of $10^{-6}$) At Room Temperature |
|---|---|
| $SmFe_2$ | −880 |
| $TmFe_2$ | −190 |
| 85 wt % Tb - 15 wt % Fe | 808 |
| 70 wt % Tb - 30 wt % Fe | 2380 |
| $TbFe_3$ | 1040 |
| $Tb_2Fe_{17}$ | 197 |
| $Tb_{.8}Dy_{.2}Fe_2$ | 1997 |
| $Tb_{.7}Dy_{.3}Fe_2$ | 1634 |
| $Tb_{.4}Dy_{.6}Fe_2$ | 1478 |
| $Tb_{.3}Dy_{.7}Fe_2$ | 1605 |
| $Tb_{.27}Dy_{.73}Fe_2$ | 1590 |
| $Tb_{.25}Dy_{.75}Fe_2$ | 1600 |
| $Tb_{.2}Dy_{.8}Fe_2$ | 1105 |
| 9 wt % Tb, 21 wt % Dy, 70 wt % Fe | 1160 |
| $TbFe_{1.6}Co_{.4}$ | 1491 |
| $TbFe_{1.6}Ni_{.4}$ | 1095 |
| $Gd_{.3}Tb_{.7}Fe_2$ | 1267 |

Note to table 1 (The magnetostrictions in these Examples represent changes in length as a magnetic field at 25 kOe. is rotated from parallel to the measurement direction to perpendicular to the measurement direction. All the materials of the binary system are either true chemical compounds or alloys as opposed to merely being physical mixtures.)

TABLE 2

Δ E Effect for Rare Earth-Iron Compounds at Room Temperature

| Compound | $V/V_o(\%)$ | $E/E_o(\%)$ |
|---|---|---|
| $SmFe_2$ | 77 | 214 |
| $TbFe_2$ | 85 | 240 |
| $ErFe_2$ | 14 | 31 |
| $TmFe_2$ | 9 | 18 |
| $TbFe_3$ | 40 | 96 |

Figure 2:
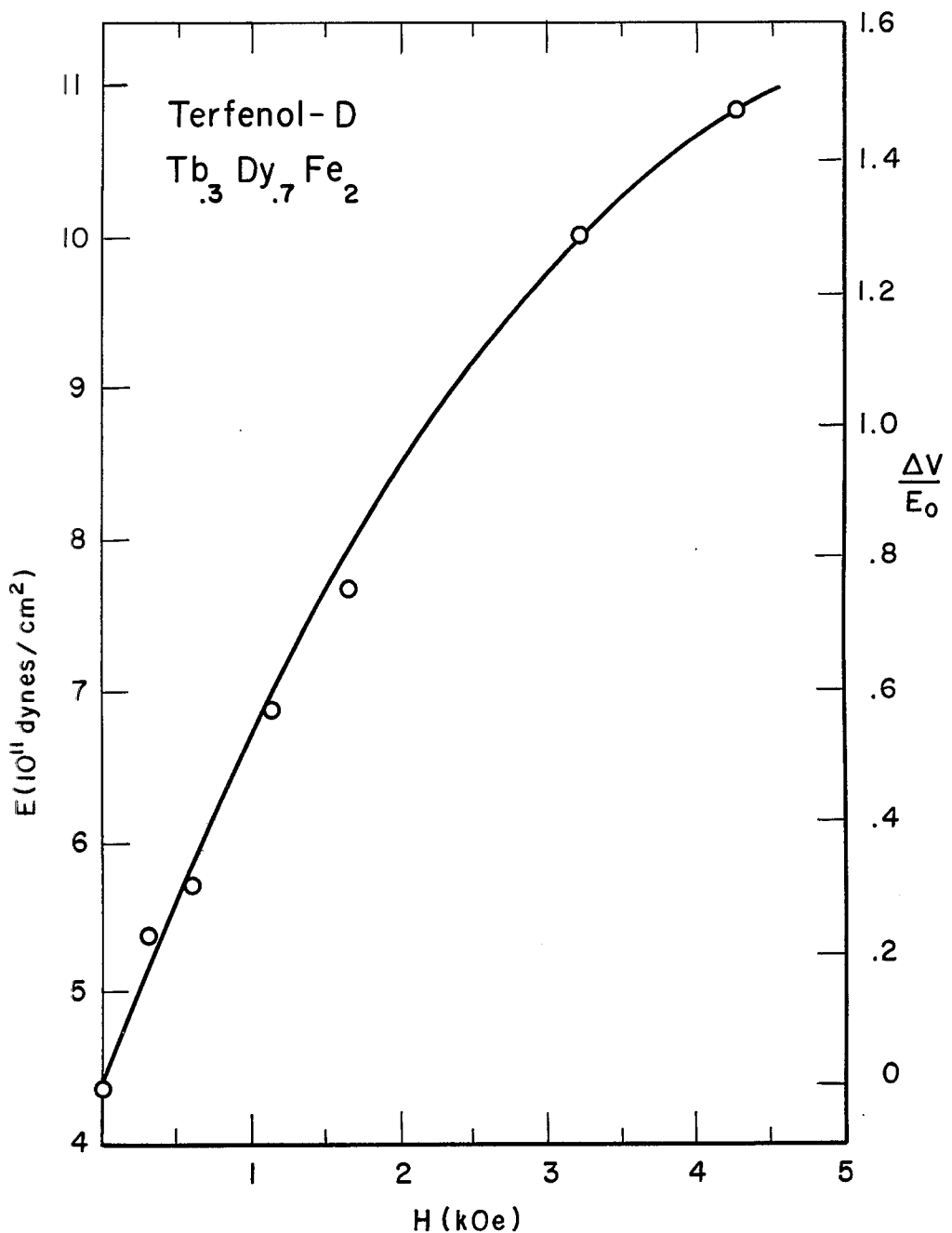
FIG. 2 is a graph showing Young's Modulus, E, and the fractional change in Young's Modulus, $\Delta E/E_o$, as functions of the magnetic field strength, H, in kOe. for the same bar as in FIG. 1.

FIGS. 1 and 2 show the experimental values obtained using $Tb_{.3}Dy_{.7}Fe_2$. ΔV equals V–Vo where V is the velocity of sound at a given magnetic field strength and Vo is the velocity of sound in $Tb_{.3}D_{.7}Fe_2$ when it is not subjected to a magnetic field. The results of the experiments show an increase in velocity of sound in $Tb_{.3}D_{.7}Fe_2$ when it is subjected to a magnetic field. For example, the experiments show an increase in velocity of sound in $Tb_{.3}Dy_{.7}Fe_2$ of 57 percent when subjected to a magnetic field strength of 4.3 kOe. over the velocity at zero field. The increase for $Tb_{.28}Dy_{.72}Fe_2$ at 4.3 kOe was 61 percent over that at zero field. Even greater velocities are predicted for these materials in magnetic fields greater than 4.3 kOe.

Materials having low magnetocrystalline anisotropies are preferred because the maximum increase in sound wave velocity will be obtained at much lower magnetic field strengths.

Very large maximum changes in sound wave velocity are predicted for $SmFe_2$ and $TbFe_2$. However, because of their high magnetocrystalline ansiotropy, these values will be achieved at high magnetic fields (H 10 kOe). In contradistinction, while the maximum change in velocity of sound in $ErFe_2$ and $TmFe_2$ are not as great, they will be obtained at low applied magnetic fields.

The particular means by which the magnetic field is generated in the sound wave transmission element is not critical. The important factor is the field strength inside of the transmission element. Thus the source of magnetic field, whether by electrical solonoid or permanent magnet, and the orientation of the field is not critical.

Adjusting in this specification means simply varying in a predetermined selected way. As illustrated in the examples, it is relatively easy to measure the velocity of sound in a material as a function of the magnetic force it is subjected to. In this manner a device can easily be calibrated.

The source which generates the sound waves is not critical; for example, a magnetostrictive element, AC coil or pizoelectric element may be used to generate the sound waves. Similarly, the velocity of the sound waves may be monitored anywhere along the element using state of the art techniques.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

A bar 4 inches × ⅛ inch × ⅛ inches of $Tb_{.3}Dy_{.7}Fe_2$ spark cut from an ingot arc - cast from high purity rare earth elements was placed in a solenoid slightly longer than the bar and with a diameter sufficient to wrap around the bar without touching. The bar was previously heat treated in an argon atmosphere at 1000°C for one week.

The solenoid-bar assembly was placed in a d.c. magnetic field whose direction was along the axis of the solenoid. The a.c. magnetic field of the solenoid, which is small compared to the d.c. field, excited acoustic oscillations. When the frequency of the a.c. field is equal to the sound velocity divided by twice the length of the bar the system is at resonance. The resonance was detected by monitoring the electrical impedance of the solenoid as a function of frequency. The results are plotted in FIGS. 1 and 2. At a d.c. magnetic field strength of 4.3 kOe (maximum for the apparatus used) the velocity of sound in the bar was increased 57 percent over the velocity of sound in the bar at zero field.

EXAMPLE 2

The procedure in Example 1 was repeated using a bar of $Tb_{.28}Dy_{.72}Fe_2$ and the velocity of sound at 4.3 kOe was observed to be 61 percent greater than at zero field.

What is claimed to be new and desired to be secured by Letters Patent of the United States is:

1. A device for varying the velocity of sound waves comprising:
    a sound wave transmission element composed of a material selected from the group consisting of alloys and true chemical compounds, said material being of the formula $RxFe_{1-x}$ wherein R is a rare earth selected from the group consisting of Sm, Tb, Dy, Ho, Er, Tm, and mixtures thereof and wherein $0.1 < x < 0.9$; and
    means for generating a magnetic field of adjustable strength in the transmission element.
2. The device of claim 1 wherein $0.1 < [x < 0.5$.
3. The device of claim 2 wherein $X = ⅓$.
4. The device of claim 3 wherein the transmission element is composed of a material of the formula $Tb_zDy_{1-z}Fe_2$ wherein $0.1 < z < 0.9$.
5. The device of claim 4 wherein $0.2 < z < 0.4$.
6. The device of claim 3 wherein the transmission element is composed of $SmFe_2$.

7. The device of claim 3 wherein the transmission element is composed of $TbFe_2$.

8. The device of claim 3 wherein the transmission element is composed of $ErFe_2$.

9. The device of claim 3 wherein the transmission element is composed of $TmFe_2$.

10. A method of adjusting the velocity of sound waves comprising:
    subjecting a material selected from the group consisting of alloys and true chemical compounds; said material being of the formula $R_xFe_{1-x}$ wherein R is a rare earth selected from the group consisting of Sm, Tb, Dy, Ho, Er, Tm, and mixtures thereof and wherein $0.1 < x < 0.9$ to a magnetic field; and
    then passing the sound waves through the material while the material is subjected to the magnetic field.

11. The method of claim 10 wherein $0.1 < x < 0.5$.

12. The method of claim 11 wherein $X = ⅓$.

13. The method of claim 12 wherein the material has the formula $Tb_zDy_{1-z}Fe_2$ wherein $0.1 < z < 0.9$.

14. The method of claim 13 wherein $0.2 < z < 0.4$.

15. The method of claim 12 wherein the material is $SmFe_2$.

16. The method of claim 12 wherein the material is $TbFe_2$.

17. The method of claim 12 wherein the material is $ErFe_2$.

18. The method of claim 12 wherein the material is $TmFe_2$.

19. The method of claim 10 wherein the strength of the magnetic field is held constant while the sound waves pass through the material.

20. The device of claim 1 wherein the material was formed by arc casting.

21. The device of claim 20 wherein the material was annealed after it was arc casted.

22. The device of claim 2 wherein the material was formed by arc casting.

23. The device of claim 22 wherein the material was annealed after it was arc casted.

24. The device of claim 3 wherein the material was formed by arc casting.

25. The device of claim 24 wherein the material was annealed after it was arc casted.

26. The device of claim 4 wherein the material was formed by arc casting.

27. The device of claim 26 wherein the material was annealed after it was arc casted.

28. The device of claim 5 wherein the material was formed by arc casting.

29. The device of claim 28 wherein the material was annealed after it was arc casted.

30. The method of claim 10 wherein the material was formed by arc casting.

31. The method of claim 30 wherein the material was annealed after it was arc casted.

32. The method of claim 11 wherein the material was formed by arc casting.

33. The method of claim 32 wherein the material was annealed after it was arc casted.

34. The method of claim 12 wherein the material was formed by arc casting.

35. The method of claim 34 wherein the material was annealed after it was arc casted.

36. The method of claim 13 wherein the material was formed by arc casting.

37. The method of claim 36 wherein the material was annealed after it was arc casted.

38. The method of claim 14 wherein the material was formed by arc casting.

39. The method of claims 38 wherein the material was annealed after it was arc casted.

* * * * *